United States Patent
Gerken et al.

(10) Patent No.: US 8,024,703 B2
(45) Date of Patent: Sep. 20, 2011

(54) BUILDING AN OPEN MODEL DRIVEN ARCHITECTURE PATTERN BASED ON EXEMPLARS

(75) Inventors: Christopher Henry Gerken, Austin, TX (US); Geoffrey Martin Hambrick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/904,105

(22) Filed: Oct. 22, 2004

(65) Prior Publication Data
US 2006/0101393 A1 May 11, 2006

(51) Int. Cl.
G06F 9/44 (2006.01)
(52) U.S. Cl. .......... 717/109; 717/104; 717/105
(58) Field of Classification Search .......... 717/104, 717/105, 109
See application file for complete search history.

(56) References Cited

U.S. PATENT DOCUMENTS

| | | | |
|---|---|---|---|
| 6,199,195 B1 | 3/2001 | Goodwin et al. | |
| 6,205,576 B1 * | 3/2001 | Rajala et al. | 717/105 |
| 6,253,367 B1 * | 6/2001 | Tran et al. | 717/108 |
| 6,463,578 B1 * | 10/2002 | Johnson | 717/124 |
| 6,601,233 B1 * | 7/2003 | Underwood | 717/102 |
| 6,665,685 B1 | 12/2003 | Bialic | |
| 6,701,517 B1 | 3/2004 | Moore et al. | |
| 6,775,680 B2 | 8/2004 | Ehrman et al. | |
| 6,981,212 B1 | 12/2005 | Claussen et al. | |
| 7,191,429 B2 * | 3/2007 | Brassard et al. | 717/104 |
| 2003/0056192 A1 * | 3/2003 | Burgess | 717/100 |
| 2003/0074648 A1 | 4/2003 | Brassard et al. | |
| 2003/0023413 A1 | 6/2003 | Srinivasa | |
| 2003/0106042 A1 | 6/2003 | Lynch et al. | |
| 2003/0134677 A1 | 7/2003 | Obied et al. | |
| 2003/0145305 A1 * | 7/2003 | Ruggier | 717/100 |
| 2003/0192027 A1 | 10/2003 | porter | |
| 2003/0212904 A1 | 11/2003 | Randle | |
| 2003/0233365 A1 | 12/2003 | Schmit et al. | |
| 2004/0002883 A1 | 1/2004 | Andrews et al. | |
| 2004/0034846 A1 | 2/2004 | Ortal et al. | |

(Continued)

FOREIGN PATENT DOCUMENTS
WO  WO 03/038682  5/2003

OTHER PUBLICATIONS
IBM Websphere Portal V4 Developer's Handbook by Rodriguez et al. Mar. 2003 (Note • reference only provided those chapters quoted by examiner).*

(Continued)

*Primary Examiner* — Wei Zhen
*Assistant Examiner* — Junchun Wu
(74) *Attorney, Agent, or Firm* — Justin M. Dillon; Gregory K Goshorn; Greg Goshorn, P.C.

(57) ABSTRACT

View templates for use in generating application content are created by analyzing and categorizing existing application examples to derive reusable abstractions of application artifacts. Example application artifacts or source modules are categorized by role and function. Based on the categorized artifacts, a generalized, abstract view for the role and function is defined. View templates are created for each abstract view and contain static content and dynamic content that varies for each instance of the template. The view templates are stored in a template library for use in a model driven application generator.

15 Claims, 4 Drawing Sheets

U.S. PATENT DOCUMENTS

| | | | |
|---|---|---|---|
| 2004/0059611 | A1 | 3/2004 | Kananghinis |
| 2004/0107124 | A1 | 6/2004 | Sharpe et al. |
| 2004/0107125 | A1 | 6/2004 | Guheen et al. |
| 2004/0111702 | A1 | 6/2004 | Chan |
| 2004/0268303 | A1* | 12/2004 | Abe et al. .................. 717/108 |
| 2005/0071825 | A1* | 3/2005 | Nagaraj et al. ............. 717/142 |
| 2005/0155016 | A1* | 7/2005 | Bender ....................... 717/106 |
| 2007/0089103 | A1 | 4/2007 | Iborra et al. |

OTHER PUBLICATIONS

Rodriguez et al. Mar. 2003 "IBM Websphere Portal V4 Developer's Handbook" (Note • reference only provided those chapters quoted by examiner).*

"A template-based approach to the generation of distributed applications using a network of workstations", Singh et al, Transactions on Parallel and Distributed Systems, vol. 2 Issue: 1 Jan. 1991, IEEE, pp. 52-67.*

"SecureUML: A UML-Based Modeling Language for Model-Driven Security", Lodderstedt et al, 2002, University of Freiburg.*

"Automatic Generation of Hypertext System Repositories A Model Driven Approach", Whitehead et al, Aug. 2004, ACM.*

Generation of Struts software artefacts from UML stereotypes, Dekhtyar, Feb. 2004, University of Hamburg; "Model-driven development of large-scale Web applications", Tai et al, vol. 48, No. 5/6 Sep. 2004, IBM.*

H. Sluiman et al., "Round Tripping Generated Text Based Files", IBMTDBS#AAA00A060457, RD n435 07-2000 Article 173 pp. 310.

E. Spring et al., "Round Trip Maintenance of Software Configuration", IBM DOSS #Aus920010702.

* cited by examiner

BUILDING AN OPEN MODEL DRIVEN ARCHITECTURE PATTERN BASED ON EXEMPLARS

DESCRIPTION

1. Field of the Invention

The present invention relates to data processing systems. In particular, it relates to software development tools for code generation. Still more particularly, the present invention relates to processes for creating code generation patterns.

2. Background of the Invention

The development of software application code and related application content has long been the province of experts. A systems development expert must analyze the business problem, select the appropriate software tools to solve the business problem and then develop the software code necessary to implement the selected solution.

The field of software engineering developed in an attempt to standardize and simplify the creation of software. Software engineering defines standard processes and procedures that are applied to develop software code. Standardization is intended to promote use of effective solutions and to promote the reuse of previously developed solution components.

Process standardization still leaves the significant task of preparing the software code to implement a solution. Software code may be source code written in one of a number of programming languages such as JAVA®, C++, C#, Pascal or others. In addition, software code may include web pages coded in HTML, database access code in SQL, and written documentation in text form or portable document format (PDF.) Although many of the object oriented languages have stressed code reuse, this has often proved difficult in practice.

Code generation has been attempted using a number of code generators. These code generators use as input a description of the business problem to be solved expressed in some form of modeling language. This language is then interpreted and source code in a selected programming language generated. Many code generators implement what is known as a Model Driven Architecture. A Model Driven Architecture is a structure in which a business model, expressed in a modeling language drives the generation of the resulting software content. One example of a Model Driven Architecture is the Object Management Group (OMG) Model Driven Architecture.

One problem with existing code generators is the inflexibility of the modeling language or the code generation capability. For example, the OMG Model Driven Architecture requires that models be expressed in a well defined notation such as Unified Modeling Language (UML.) UML is a structured language that requires specific content and keywords to describe the business problem. The structure allows code generation to be accomplished by recognizing structural components, and generating software content based on those components. Unfortunately, many business problems are not readily expressed in UML compliant models, eliminating the ability to use generators relying on UML as the model.

Other model architectures provide fixed output generators. That is, the developer has no control over the form or format of the outputs generated base on a model input.

A problem therefore exists in providing a Model Driven approach to software content generation that is flexible in the expression of the business model as well as the content generation options. In addition, a problem exists in capturing the knowledge of systems development experts so that generated code can represent the best of breed solutions to business problems.

SUMMARY OF THE INVENTION

The present invention is therefore directed at providing a process for capturing expert software design solutions as patterns for use in a model driven software content generation system.

The present invention provides method for analyzing application examples to create view templates for use in building an application or software content using an open model driven architecture. The method includes: analyzing an example of application content; categorizing each content artifact of the example; identifying portions of each artifact as dynamic content; grouping the categorized artifacts and creating abstract artifact descriptions; and generating a view template for each of the abstract artifact descriptions, the view templates having static and dynamic content.

DETAILED DESCRIPTION

The preferred embodiment of the present invention implements a model driven architecture that maintains flexibility of expression in each of the descriptive components. The preferred embodiment enables construction of view templates capturing application content and structure from existing application examples that can be used to generate new applications. This process allows capturing of good quality techniques for reuse by other developers.

Figure 1:
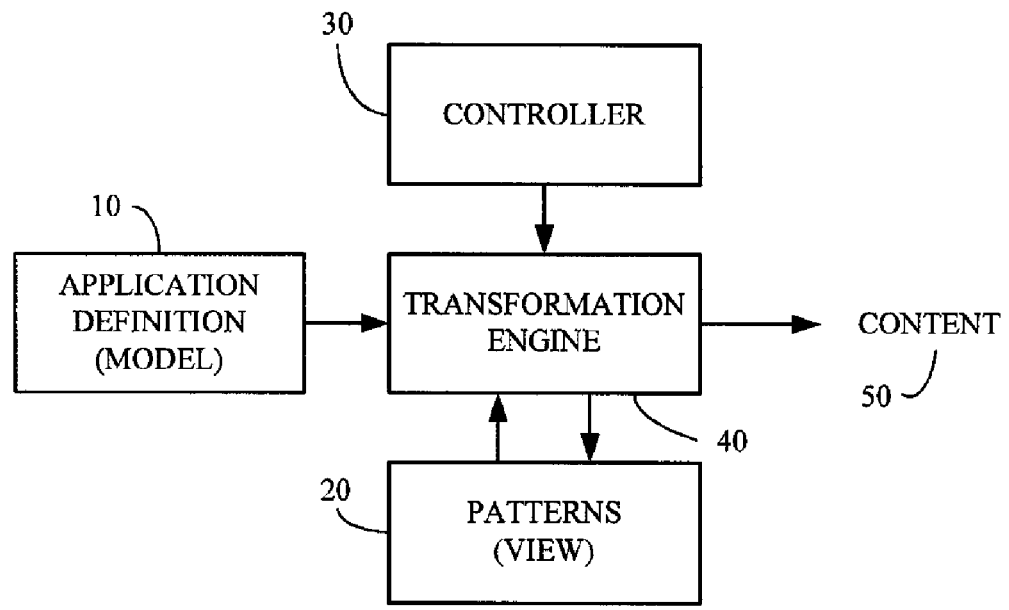
FIG. 1 is a block diagram illustrating the major functions of the preferred embodiment of the present invention.

FIG. 1 illustrates the component parts of an open model driven content generator for use with the present invention. An application definition 10 is provided that sets forth a model of the problem to be solved. The model is expressed in a descriptive grammar. For example, the model may be expressed in extensible markup language (XML) which includes tags and descriptors for the model. Other forms of expression can be used, however, such as a simple Tag=value specification or through the definition of a set of keywords. An application definition may look similar to the following.

```
<app>
    <xml name="PolicySearch" pkg="com.issw.policy.data" >
        <beans>
            <bean class="Policy" >
                <property name="policyNumber"  type="String"  />
                <property name="name"          type="String"  />
```

```
                <property name="type"              type="String"      />
                <property name="car"               type="Car" single="false"     />
                        <property name="address"              type="Address" single="true"   />
            </bean>
            .....
            <bean class="PacketSend" >
                <property name="query"             type="Policy" single="true"     />
            </bean>
            <bean class="PacketReceive" >
                <property name="results"           type="Policy" single="false"    />
            </bean>
        </beans>
    </xml>
    <facade name="PolicySearch" pkg="com.issw.policy.service" send="PacketSend" receive="PacketReceive" />
</app>
```

Allowing flexibility in expressing the application model reduces the barriers to development for the application developer. The flexible expression structure enables use of the presently claimed invention to develop a large variety of application content. Model descriptions are not limited to a set of problems that can be expressed in a rigid model language.

View templates or content patterns 20 are developed according to the preferred embodiment of the present invention as described in greater detail below. The view templates are accessed by the content developer from template libraries that collect view templates that implement a variety of application solutions. In an on-going development organization, libraries of view templates will be assembled as a result of development projects. A template may have the form shown in the table below.

```
package <content node="/action/package"/>;
import java.lang.reflect.InvocationTargetException;
import org.eclipse.core.resources.I<content node="/action/target" format="U1"/>;
....
public class <content node="/action/prefix"/>Action implements
IWorkbenchWindowActionDelegate , IRunnableWithProgress {
        private    IStructuredSelection     tSelection;
        private    IWorkbench                                tWorkbench;
        private    I<content node="/action/target" format="U1"/>[ ]
        <content node="/action/target"/>s;
        /**
         * Constructor for <content node="/action/prefix"/>Action
         */
        public <content node="/action/prefix"/>Action( ) {
            super( );
        }
        /**
         * @see IActionDelegate#run(IAction)
         */
        public void run(IAction arg0) {
            // Gather the selected <content node="/action/target"/>s, if any.
            int count = tSelection.size( );
            <content node="/action/target"/>s = new I<content node="/action/target" format="U1"/>[count];
            Object objs[ ] = tSelection.toArray( );
            for (int index = 0; index < count; index++) {
                <content node="/action/target"/>s[index] = (I<content node="/action/target" format="U1"/>) objs[index];
            }
            // Perform any prompts or confirmations here before the action
            // takes place
            <marker>Insert code here to handle necessary prompts or confirmations</marker>
            try {
                ProgressMonitorDialog dialog= new ProgressMonitorDialog(getShell( ));
                dialog.run(true, true, this);
            } catch (InvocationTargetException ex) {
            } catch (InterruptedException e) {
                // do nothing on cancel
                return;
            }
        }
        /**
         * @see IRunnableWithProgress#run(IProgressMonitor)
         */
        public void run(IProgressMonitor progressMonitor)
                throws InvocationTargetException, InterruptedException {
            // If possible, count the number of discrete steps this invocation
```

```
            // of the action will perform and setup the progress monitor...
            String taskDescription = "<content node="/action/task" />";
            int numberOfSteps = tSelection.size( );
            progressMonitor.beginTask(taskDescription,numberOfSteps);
            for (int index = 0; index < numberOfSteps; index++) {
<marker>Insert the code to perform the action against one of the selected <content
node="/action/target"/>s</marker>
            // Perform the actual action logic here.
            I<content node="/action/target" format="U1"/> <content
node="/action/target"/> = <content node="/action/target"/>s[index];
            // When the action on a selected <content node="/action/target"/> is
            // complete, increment the progress indicator
            progressMonitor.worked(1);
        }
    }
    /**
     * @see IWorkbenchWindowActionDelegate#dispose( )
     */
    public void dispose( ) {
    }
    /**
     * @see IWorkbenchWindowActionDelegate#init(IWorkbenchWindow)
     */
    public void init(IWorkbenchWindow window) {
        tWorkbench= window.getWorkbench( );
    }
    /**
     * Returns the active shell.
     */
    protected Shell getShell( ) {
        return JavaPlugin.getActiveWorkbenchShell( );
    }
    /**
     * @see IActionDelegate#selectionChanged(IAction, ISelection)
     */
    public void selectionChanged(IAction arg0, ISelection selection) {
        if (selection instanceof IStructuredSelection)
            tSelection= (IStructuredSelection)selection;
        else
            tSelection= StructuredSelection.EMPTY;
    }
}
```

The controller description 30 specifies how the application definition 10 will use the patterns 20 to create content output 50. The controller analyzes the application definition and acts based on identified keywords in the grammar. Controller actions can be divided into flow control actions and pattern application actions. These actions comprise a scripting language that is used by the application developer to specify application generation in a flexible manner. The preferred embodiment of the present invention uses a scripting language specifically developed for content generation. A controller according the present invention could, however, use other languages to control code generation. For example, the controller could be expressed in the JAVA® programming language, JAVASCRIPT® scripting language, or Visual Basic language. The scripting language of the present invention permits specification of particular application definition grammars. Since the application grammar is flexible, the controller must similarly be flexible to parse and interpret the application definition. The controller and application definition must therefore be developed together for a particular application to ensure that application definition expressions have the necessary output transformation support.

Flow control actions include conditional actions that apply a particular pattern only if certain conditions exist or repetitive actions such as applying a pattern multiple times. Pattern application actions include generating content output based on variable data specified in the application definition and content output data specified in a pattern. The controller specifies which pattern is to be selected and which variable data is applied to that pattern. The controller specifies how many different output files are to be generated and specifies the structure for the names of those file. An example of a controller element or controller description is shown below.

```
** High-Level Controller
<setAttr node="/action" name="dir"><content node="/action/package"
format="PD"/></setAttr>
<start template="plugin.xml.pat"
resource="%/action(dir)%/%/action/prefix%...plugin.xml" />
<start template="Action.java.pat"
resource="%/action(dir)%/%/action/prefix%Action.java"
/>
```

The content generation process is managed by a transformation engine 40. Transformation engine 40 accesses the controller description 30, application definition 10 and templates or patterns 20. The application definition 10 is read by the transformation engine 40 and parsed to locate keywords and variable data. This parsing occurs using well known techniques of XML analysis or other lexical analysis of a textual file. Keywords are used to locate actions specified in the controller description 30. When a match is found, the matched action is applied. This causes a pattern 20 to be accessed and content to be generated. Content generation involves writing out specified static information and replacing dynamic information with application instance specific information passed to the transformation engine. The result is application content that solves the business problem modeled in the application definition.

The preferred embodiment of the present invention employs an open model driven architecture. The architecture is "open" because of the ability to flexibly specify the application definition (model), the controller, and the view templates. The modeling and generation process is not restricted to a certain class of models or models expressed in a fixed format or language.

The present invention implements a Model-View-Controller (MVC) model of a system. MVC models were originally developed to reduce the complexity of software systems that provide graphical user output using a graphical user interface (GUI.) In such a system the user view of data is kept separate from the rules for accessing the data to be displayed. The application logic for accessing and processing the data is specified in the model. Finally, the controller specifies how data acquired by the model is mapped to the GUI display (the view.)

A system designed using MVC modeling principles provides independence between the model and the view. This reduces implementation complexity because the view designer can concentrate solely on user interface issues while the model designer can concentrate on application logic and data access issues. This independence permits independent design changes to the user interface or the application logic. The user interface could be changed from a web browser display to a workstation client display or a portable device display without modifying the model specification.

In the present invention, the component independence of the MVC model is used to give the designer flexibility in application definition and content creation. For example, a particular application definition can be used to generate content output in different programming languages through the use of different views for each of the languages. Thus, an application definition may specify certain business requirements. The controller will map these to certain patterns. If matched to C language patterns, C program source code can be generated to implement the business solution. Use of a different controller that maps to JAVA° language patterns will result in a JAVA® solution.

The preferred embodiment generates content output. Content output can be any of a plurality of textual data or binary data. This output may be programming code for a particular programming language such as C, JAVA®, or C++. Output also can include descriptive materials such as solution documentation or descriptions. The output may also include web pages or other web components. Binary data may include bitmapped images, graphics or sound output.

Figure 2:
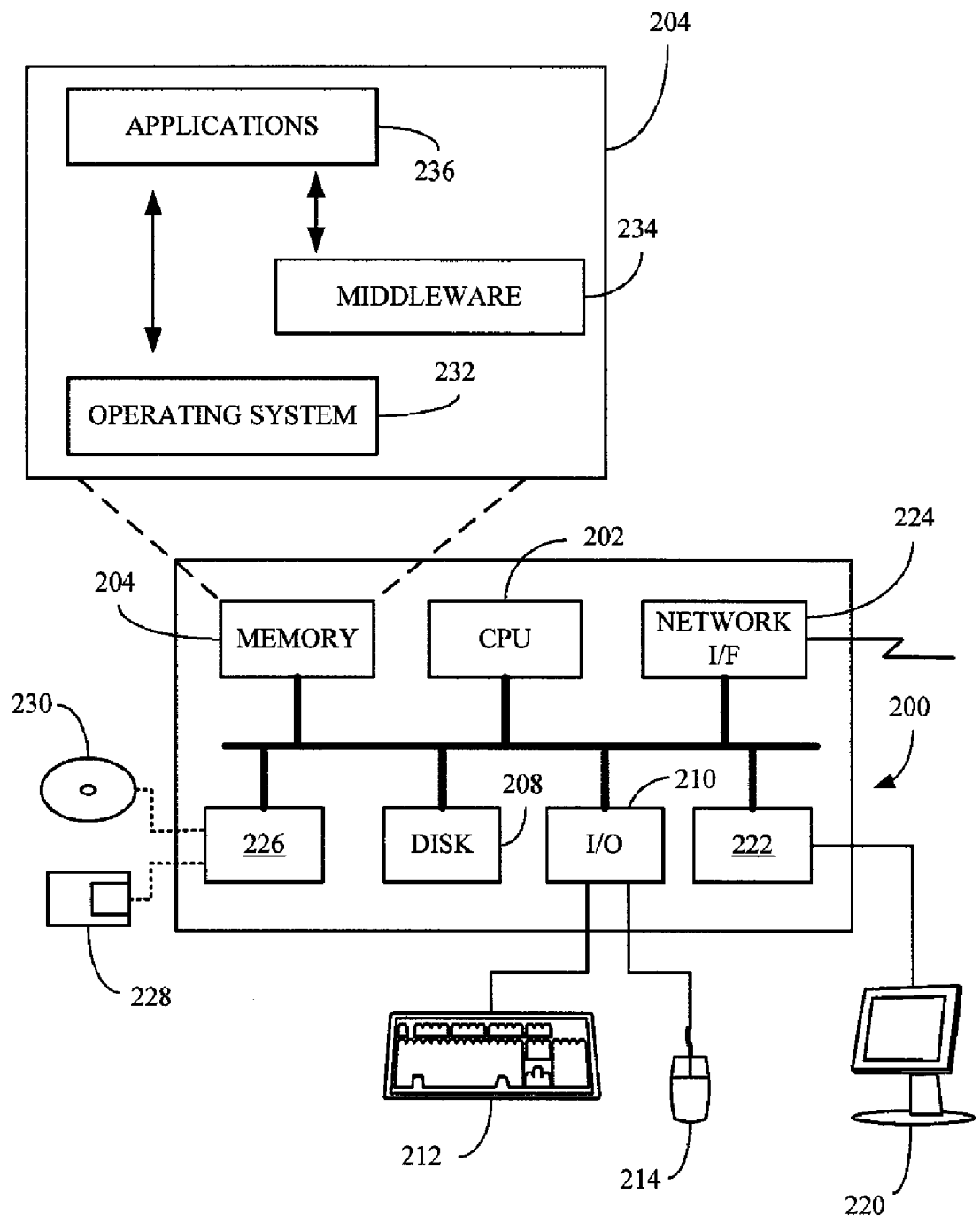
FIG. 2 is a block diagram of a processing system used in the preferred embodiment of the present invention.

The present invention is preferably employed in conjunction with a computer system such as that shown generally in FIG. 2. The computer system 200 has a central processing unit 202 for processing program instructions, a random access memory 204 that stores instructions and data to be processed. Permanent storage 208 is provided in the form of a magnetic disk drive or similar technology. User interface devices are controlled by I/O Controller 210 and include, for example, a keyboard 212 and a pointing device or mouse 214. Information is displayed by video controller 222 on display device 220 which can be a cathode ray tube (CRT) video display, a liquid crystal diode display (LCD) or similar device. The system 200 communicates with other devices or with the internet (not shown) using network interface 224. Removable device controller 226 manages removable storage devices such as floppy diskette 228 or CD-ROM or DVD-ROM 230. The system components in system 200 are linked together and communicate through system bus 206.

Random access memory 204 manages the program instructions and data for the computer system. In a typical computer system, an operating system 232 will manage the processing of tasks on the computer and the interface between particular programs and the hardware subsystems. Application programs 236 execute on the system to perform particular tasks. The number of application programs running at one time is limited only by the resources of the system including the operating system limitations. Finally, a variety of middleware 234 may be provided for certain tasks. Middleware 234 are programs that provide generally used facilities used by application programs or directly by users. Middleware can include software such as database management systems such as IBM DB2, MICROSOFT SQLSERVER®, MYSQL®. It may also include web servers and web application servers such as IBM WEBSPHERE® Application Server or MICROSOFT® IIS. Middleware provides generalized services that link together programs and systems to achieve the desired business goals.

Examples of computer systems that can be used in the preferred embodiment include the IBM THINKCENTER® series of personal computers, IBM THINKPAD® notebook computers, IBM XSERIES® workstations, and other machines based on INTEL® or AMD® central processing units (CPUs). These computer systems may operate under an operating system such as MICROSOFT WINDOWS XP®, Linux, or AIX®. The present invention is not limited to a particular hardware or software structure except as claimed.

The invention also may be embodied in a computer program product, such as a diskette, optical ROM, or other recording medium, for use with a data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

The preferred embodiment of the present invention is preferably used in conjunction with an integrated development environment (IDE.) An IDE provides a number of facilities to assist the software developer. The IDE may include project, library and file management features, editors for editing and validating program source code, and compilers for creating compiled executable versions of the desired programs. An example of a IDE is the IBM WEBSPHERE® Application Studio Developer (WASD). Another example is the Eclipse development system managed by the Eclipse Foundation.

Figure 3:
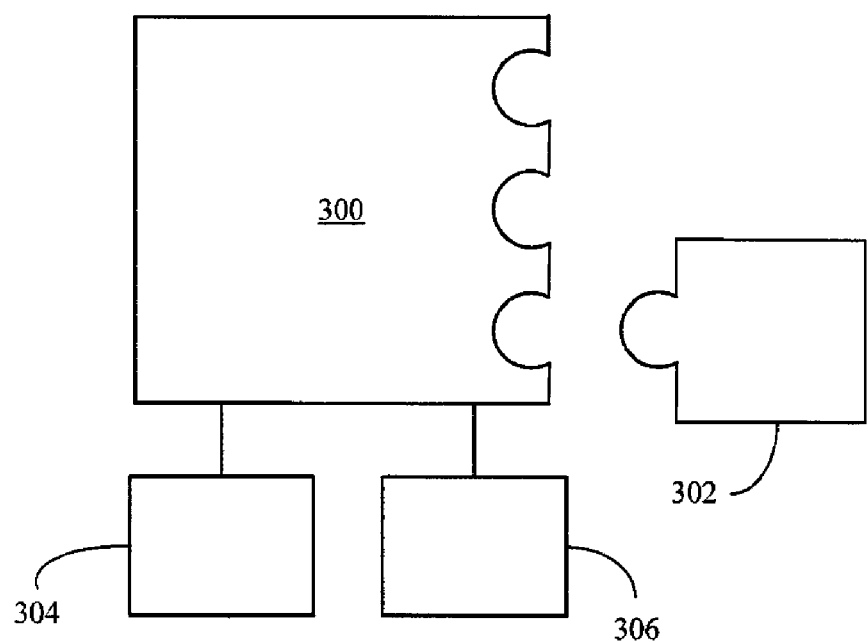
FIG. 3 is a block diagram of an integrated development system according to an embodiment of the present invention.

A system according to the present invention is preferably embodied as an addition to the IDE system. In WASD and Eclipse IDEs such an addition is termed a "plug-in." As shown in FIG. 3, a content generator 302 is added as a plug-in to IDE 300. Operating as a plug-in allows content generator 302 to use the facilities of the IDE to organize the content and to manage content storage in a file system 304. Patterns can be stored in the same file system as the generated content or can be stored in a local or network repository 306.

The IDE also provides editors that can be used to construct application definition files and controller definitions. Editor features such as find or find and replace can also be used by the application developer and the transformation engine. The use of an IDE, however, is not required to practice the present invention because the functions performed by the IDE can be performed directly by the preferred embodiment.

Figure 4:
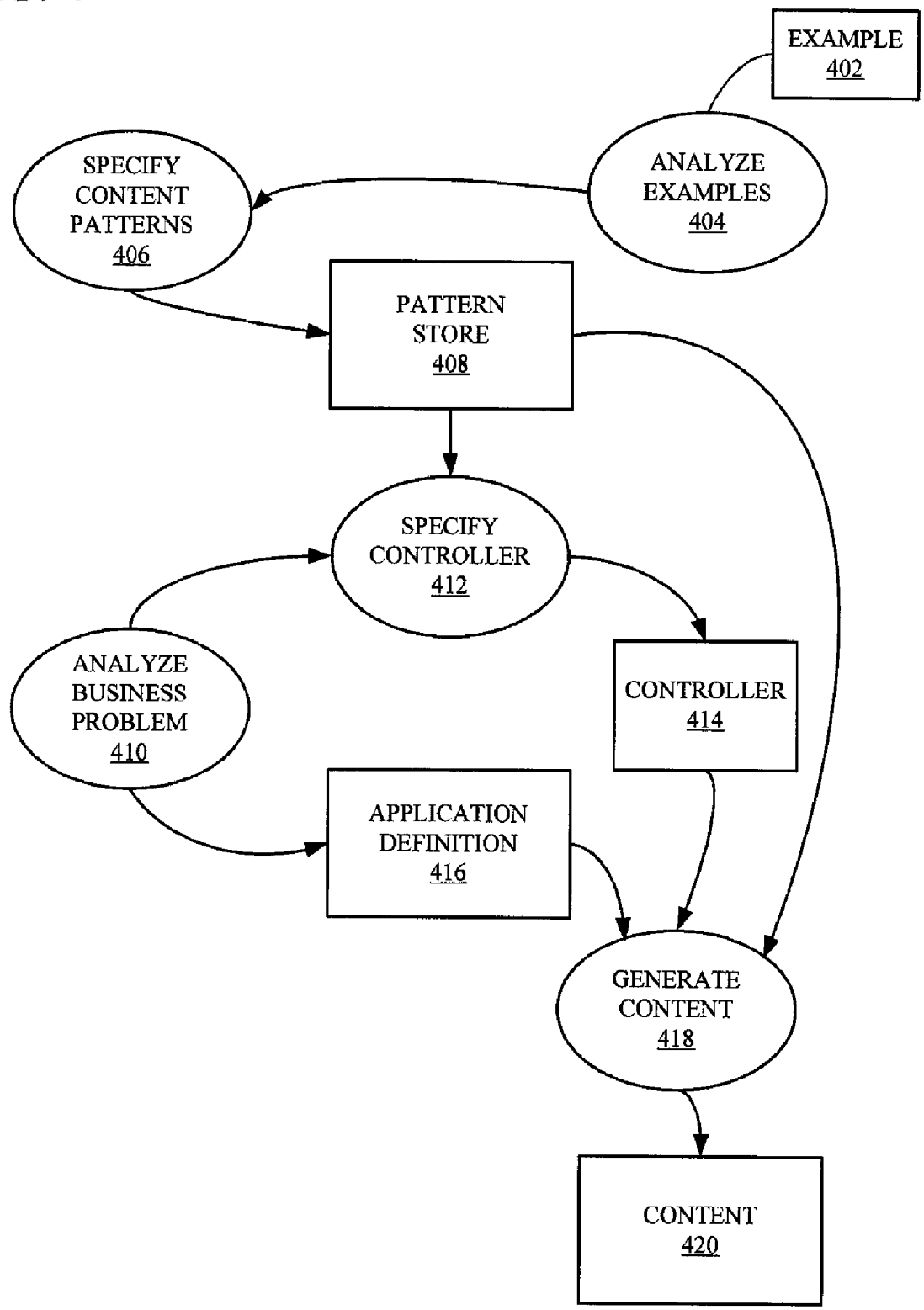
FIG. 4 is a process diagram illustrating the processes and data employed in the preferred embodiment of the present invention.

FIG. 4 illustrates the process flow of a content generation process that employs the present invention. Content view templates or patterns 408 are by applying the preferred embodiment of the present invention to existing content, for example, an existing application program that performs a certain function. The exemplars are analyzed 404. Results of the analysis are used to specify content patterns or view templates in a reusable format 406 and the resulting patterns stored for future use in pattern store 408. The process of exemplar analysis will be described in greater detail below with reference to FIG. 5.

A view template includes static and dynamic content. For example, if programming language code is being generated, the template may include static program language keywords. Particular program variables will be represented as dynamic code. The template is used to generate code by replacing the dynamic code with information extracted from the application definition as specified by the controller definition. The controller definition provides the mapping between information provided in the application definition 416 and the dynamic portions of the output. Dynamic portions may represent "variables" in a programming language, but may also represent other changeable information. Thus, the chapter titles in a document could be represented as having static and dynamic parts. Program code may include dynamic names for classes and methods as well. A standardized naming convention is used in one embodiment to control the types and formats of names used throughout the resulting system.

The analysis of the business problem 410 results in an application definition 416. The term "business problem" is used to describe the problem scope the content is desired to solve. It need not be "business" related and can include analysis of games, non-profit organization issues, entertainment or recreational problems. In each case the problem is analyzed and the results expressed as an application definition. The analytical results are also used to specify the controller 412. The controller definition is developed based on the application analysis and the available patterns 408. The controller definition is stored as a controller definition 414.

Finally, content is generated 418 using a transformation engine. Content generation is performed by accessing the application definition 416 under the control of controller 414. The generator applies the application definition variables to the patterns 408 to create generated content 420.

Figure 5:
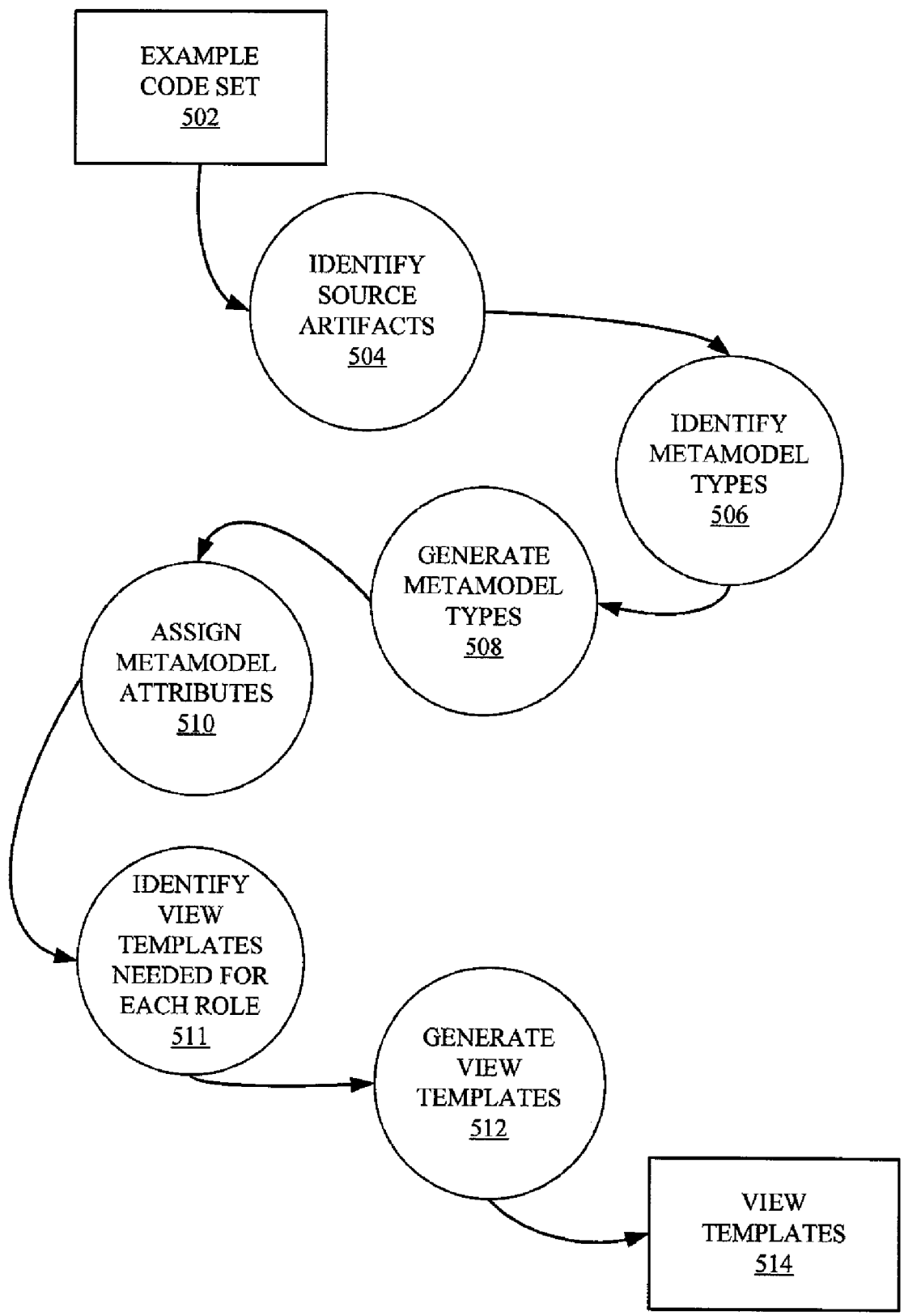
FIG. 5 is a process chart indicating the process steps and information used in creating a view template according to the present invention.

The process of developing a view template from an exemplar according to the present invention will be described with reference to FIG. 5. A developer undertakes view template development when he or she discovers that the problem he or she is attempting to solve does not conform to any existing view templates. This typically will occur during the analysis phase above where the application definition and controller description are being generated. When the lack of a view template is discovered, the developer must obtain an example code set 502 for use as an exemplar. Example code set 502 can be the result of previous manual coding work, or can be collected from example code developed by subject matter experts. For example, a problem requiring a database access solution may require code examples from a database professional proficient in DB2 DBMS or other similar DBMS.

The first phase of view template creation according to the present invention requires identification and categorization of source artifacts 504. Artifacts according to the present invention are any content required by the application. Typically these will take the form of a source file. A source file is content that is either used directly or is used as input to a compiler or other transformation engine to create an executable or interpreted application component.

Source artifacts according the present invention include Java source files, HTML files, XML files, C language files, and documentation files. These source artifacts are classified to provide high level metamodel types. Thus, a "Java source file" is one metamodel type.

Next, the designer determines the metamodel types represented by the artifacts 506. Metamodel types can be states, transitions and data objects present in the application. These metamodel types determine the object types of the view pattern and are represented as separate patterns. For example, in a web based applications based on J2EE or web portal architectures, the metamodel types are transitions, states and data objects and determine and define the Java servlets, portlets, enterprise Java beans (EJBs), Java server pages (JSPs), HTML files and related content. Similarly, the database bean source files are specified based on the schemas, tables and columns of databases being accessed.

In analyzing the source artifacts identified in step 504, the designer begins by listing each artifact and categorizing it according to purpose and function. Each artifact is then classified according to metamodel type 508. The metamodel types are based on the states, transitions and data objects from step 506. The designer uses the metamodel type and purpose to begin to condense the existing artifacts into a set of models that represent the metamodel type that is an abstraction of the related artifacts. The metamodel types also indicate the roles of the artifacts.

The designer also begins to determine metamodel attributes 510. The attributes of a metamodel type provide the specific details that transform a metamodel object into a particular object instance. For example, a data object metamodel type has a table attribute that, when specified, allows creation of a data object for accessing a particular table. The preferred embodiment of the present invention analyzes the example code and presents the designer with view templates that contain sections of example code highlighted as candidates to become dynamic content. The tool permits the developer to select individual candidates and replace all occurrences in the model with a dynamic attribute reference. The designer can specify other dynamic content sections or add static content to create the final view template.

Metamodel attributes typically comprise on of three attribute types. Core attributes are those that comprise basic application requirements. For example, the names of application states are core attributes. Naming attributes are derived from other attributes according to specific naming conventions. For example, a data access object name for an object used to an Employee database table may be named "EmployeeAccess". Derived attributes are those derived in a fixed manner from other attributes. For example, the source code for a Java class names "a.b.c.MyClass" is stored in a file structure named "a/b/c/MyClass.java."

Once metamodel types and attributes are captured, the developer must analyze the model to determine whether view templates are needed for artificial roles 511. Artificial roles are metamodel types not directly required by the application definition but necessary to complete the application code. After the additional views are defined, the developer can generate view templates 512. The generated view templates 514 are stored in a file system or view template library (not shown.)

The view template or pattern 514 has both static and dynamic content portions. The static portions represent content that is generated as specified into the content output. Dynamic content varies based on the output instance. Object attributes generally are expressed as dynamic content in a view template. For example, the data access object name would be a dynamic attribute of a data access object. When the view template is applied, the dynamic variable for data object access name is replaced by the actual data object name provided by the content generator.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method, comprising:
   analyzing application content to identify a plurality of content artifacts;
   categorizing each content artifact of the plurality of content artifacts according to purpose and function;
   identifying portions of each content artifact as dynamic content;
   grouping the categorized content artifacts according to the categorization and identification to create abstract artifact roles;
   generating, based upon the abstract artifact roles, a view template for each of said abstract artifact roles, said view templates comprising static and dynamic content.

2. The method of claim 1, wherein said content artifacts are source code files.

3. The method of claim 1, wherein said content artifacts are web application files including, HTML source files, XML source files, portlet code and JSP source code.

4. The method according to claim 1, wherein the static content represents program language statements.

5. The method of claim 1, wherein the dynamic content comprises attributes formed by applying a naming convention to application data.

6. The method of claim 1, wherein the identifying comprises:
   indicating sections of the content artifacts as potential dynamic content sections; and
   replacing selected indicated sections with a dynamic attribute indicator upon selection by a user.

7. A system for developing view templates, comprising:
   a processor;
   storage, coupled to the processor, for storing example code artifacts;
   logic, stored on the storage for execution on the processor, for categorizing each of said example code artifacts according to purpose and function;
   logic, stored on the storage for execution on the processor, for grouping said example code artifacts based on the categorization to produce corresponding artifact roles;
   logic, stored on the storage for execution on the processor, for generating a view template, based upon the artifact roles, having static content portions and zero, one or more dynamic content portions; and
   logic, stored on the storage for execution on the processor, for storing view templates for reuse.

8. A computer program product comprising:
   a storage medium for storing program code containing logic for generating view templates from example code, the logic including program logic for analyzing an example of application content by:
   categorizing each content artifact of said example according to purpose and function;
   identifying portions of each content artifact as dynamic content;
   grouping the categorized artifacts according to the categorization and identification to create abstract artifact descriptions;
   generating, based upon the artifact roles, a view template for each of said abstract artifact descriptions, said view templates comprising static and dynamic content.

9. A computer program product according to claim 8, further comprising: establishing naming rules for dynamic content replacement.

10. The computer program product of claim 8, wherein the step of identifying portions as dynamic content includes visually highlighting portions of code that are candidates to be dynamic code and receiving user indication of code sections selected to be dynamic code.

11. The system of claim 7, wherein the example code artifacts are source code files.

12. The system of claims 7, wherein said example code artifacts are web application files including, HTML source files, XML source files, portlet code and JSP source code.

13. The system according to claim 7, wherein the static content portions represents program language statements.

14. The system of claim 7, wherein the dynamic content portions comprises attributes formed by applying a naming convention to application data.

15. The system of claim 7, the logic for identifying, comprising:
   logic, stored on the storage for execution on the processor, for indicating sections of the example code as potential dynamic content sections; and
   logic, stored on the storage for execution on the processor, for replacing selected indicated sections with a dynamic attribute indicator upon selection by a user.

* * * * *